United States Patent
Wang et al.

(10) Patent No.: US 11,351,706 B2
(45) Date of Patent: Jun. 7, 2022

(54) AUTOMATED PROCESS FOR FABRICATING ORAL CARE IMPLEMENTS

(71) Applicant: Colgate-Palmolive Company, New York, NY (US)

(72) Inventors: Peng Wang, Yangzhou (CN); Shiyong Xia, Yangzhou (CN); Tao Xie, Yangzhou (CN)

(73) Assignee: Colgate-Palmolive Company, New York, NY (US)

( * ) Notice: Subject to any disclaimer, the term of this patent is extended or adjusted under 35 U.S.C. 154(b) by 333 days.

(21) Appl. No.: 16/346,293

(22) PCT Filed: Nov. 2, 2016

(86) PCT No.: PCT/CN2016/104335
§ 371 (c)(1),
(2) Date: Apr. 30, 2019

(87) PCT Pub. No.: WO2018/081946
PCT Pub. Date: May 11, 2018

(65) Prior Publication Data
US 2020/0055218 A1 Feb. 20, 2020

(51) Int. Cl.
*B29C 45/16* (2006.01)
*B29C 45/42* (2006.01)
(Continued)

(52) U.S. Cl.
CPC .......... *B29C 45/162* (2013.01); *B25J 11/005* (2013.01); *B29C 45/0084* (2013.01);
(Continued)

(58) Field of Classification Search
CPC .............................. B29C 2045/7242
See application file for complete search history.

(56) References Cited

U.S. PATENT DOCUMENTS

| | | | |
|---|---|---|---|
| 5,700,498 A | 12/1997 | Renzo et al. | |
| 5,725,041 A | 3/1998 | Schultz | |

(Continued)

FOREIGN PATENT DOCUMENTS

| | | | |
|---|---|---|---|
| CA | 2328919 A1 * | 11/1999 | ............... A46D 3/08 |
| CN | 1298285 | 6/2001 | |

(Continued)

OTHER PUBLICATIONS

CN-103,660,126 (Qiuping Nov. 2013 (online machine translation), [Retrieved on Apr. 12, 2021]. Retrieved from: Espacenet (Year: 2013).*

(Continued)

*Primary Examiner* — Kelly M Gambetta
*Assistant Examiner* — Andrés E. Behrens, Jr.

(57) ABSTRACT

A system comprises a fully automated fabrication cell (20) for forming overmolded oral care implements. The cell (20) includes a cluster of process stations (21) including injection molding machines operable to first form oral care implement preforms and then overmold the preforms with an overlay to create fully formed oral care implement bodies. In one example, the overlay may be a flexible elastomeric or rubber material while the preform may comprise a more rigid plastic material. Transfer of the preforms and bodies between the process stations (21) is fully automated and performed by a computer-operated robot (40) having a jointed articulated arm. A grasping tool (60) disposed on an end of the arm (42) releasably engages and transports a plurality of preforms and/or bodies simultaneously. The tool provides two different methods for engaging and holding the toothbrush skeletons/bodies. A programmable controller (130) automatically controls the robotic arm (42)'s operation and movement.

6 Claims, 9 Drawing Sheets

(51) Int. Cl.
  *B29C 41/42*   (2006.01)
  *B29C 45/00*   (2006.01)
  *B29C 35/00*   (2006.01)
  *B25J 11/00*   (2006.01)
  *B29C 35/16*   (2006.01)
  *B29C 44/06*   (2006.01)
  *B29L 31/42*   (2006.01)

(52) U.S. Cl.
  CPC .. *B29C 45/1618* (2013.01); *B29C 2045/1621* (2013.01); *B29L 2031/425* (2013.01)

(56) References Cited

U.S. PATENT DOCUMENTS

| | | | |
|---|---|---|---|
| 5,833,902 | A | 11/1998 | Coxhead et al. |
| 6,054,075 | A | 4/2000 | Inaba et al. |
| 6,296,472 | B1 | 10/2001 | Ito et al. |
| 6,511,617 | B1 | 1/2003 | Martin et al. |
| 6,833,103 | B2 | 12/2004 | Elgner et al. |
| 7,921,499 | B2 | 4/2011 | Huber et al. |
| 9,656,416 | B2 | 5/2017 | Takatsugi et al. |
| 9,770,857 | B2 | 9/2017 | Seki et al. |
| 2010/0101037 | A1* | 4/2010 | Gross .................. B29C 37/0025 15/167.1 |
| 2017/0203493 | A1* | 7/2017 | Marastoni ........... B29C 49/4205 |

FOREIGN PATENT DOCUMENTS

| | | | | |
|---|---|---|---|---|
| CN | 102166807 | A | 8/2011 | |
| CN | 102223993 | | 10/2011 | |
| CN | 103660126 | * | 11/2013 | ............. B29C 45/03 |
| CN | 103660126 | * | 12/2013 | ............. B29C 45/03 |
| CN | 103660126 | B | 3/2014 | |
| CN | 203876179 | U | 10/2014 | |
| CN | 204977331 | * | 9/2015 | |
| CN | 204773278 | | 11/2015 | |
| CN | 105172037 | | 12/2015 | |
| CN | 204977331 | U | 1/2016 | |
| CN | 105856494 | | 8/2016 | |
| DE | 10145864 | A1 | 4/2003 | |
| EP | 1079712 | | 3/2003 | |
| EP | 2191951 | * | 6/2010 | .......... B29C 37/001 |
| WO | 1999/01055 | | 1/1999 | |

OTHER PUBLICATIONS

CN103660126 (Qiuping) Dec. 2013 (online machine translation), [Retrieved on Jun. 9, 2021], Retrieved from: Espacenet (Year: 2013).*

CN-204977331 (Wei) Sep. 2015 (online machine translation), [Retrieved on Jun. 9, 2021], Retrieved from: Espacenet (Year: 2015).*

International Search Report and Written Opinion of the International Searching Authority in International Application No. PCT/CN2016/104335, dated Jul. 19, 2017.

* cited by examiner

AUTOMATED PROCESS FOR FABRICATING ORAL CARE IMPLEMENTS

BACKGROUND

The present invention relates to injection molding processes and methods suitable for forming oral care implements, and more particularly to a two-stage injection molding process performed in a fully automated fabrication cell.

Processes employed in the manufacture of oral care implements such as toothbrushes involving injection molding often include manual fabrication and product staging/transfer steps which are performed by a human operator. In addition, such manufacturing methods are sometimes constrained by the need to manually transfer partially completed products between several remote stations for finishing. These factors adversely increase unit production costs and decrease the overall efficiency of the process.

An improved process and method is desired having increased product output, greater efficiency, and associated reduced costs.

BRIEF SUMMARY

The present invention provides a system comprising a fully automated fabrication cell and related method for forming oral care implements, such as without limitation toothbrushes. In one embodiment, the cell may include two-stage injection molding processes capable of producing a fully molded toothbrush body having a composite construction comprised of a base material and an overmolded overlay material. The body is fully formed in the cell and readied for a final step of tufting the bristles/filaments onto the head of the toothbrush in a separate operation. However, in other embodiments contemplated, the bristle tufting operation such as AFT (Anchor Free Tufting) or another method used could be incorporated into the same fabrication cell with the molding operations.

The fabrication cell comprises an array of injection molding machines configured and operable to first form the initial molded toothbrush body preforms (also referred to herein as "skeletons") of a first material from raw plastic pellets or granules in a first molding step. Next, a second overlay material which may be different than the first material of the skeleton is applied thereon in a second overmolding step typically to preselected portions of the skeleton, thereby creating fully formed or molded toothbrush bodies. In one non-limiting example, the overlay material may be a flexible elastomeric or rubber compound and the skeleton may be formed of a harder more rigid plastic material such as without limitation polypropylene or polyethylene.

The transfer and staging of the toothbrush skeletons and finished bodies between different process stations (e.g. injection molding, cooling, alignment, product storage, etc.) in the fabrication cell is fully automated and performed by a computer operated robot having a jointed articulated arm. A specially configured grasping tool is disposed on a distal end of the arm which is operable to releasably engage and transport a plurality of toothbrush skeletons or bodies simultaneously. In one embodiment, the tool provides two different methods for engaging and holding the toothbrush skeletons/bodies as further described herein.

A controller including a programmable processor directs and controls the robot's movements and tool's position, operation, and orientation, in a manner analogous to that of CNC (Computer Numerical Control) machines. The processor is preprogrammed and configured with program instructions (e.g. control logic/software) which are executed by the processor to control operation of the robot and its tool. The processor may further control the sequencing and operation of the different process stations, thereby orchestrating the movement and timing of the process station and robot operations for maximum efficiency. In one embodiment further described herein, the robotic arm of the robot may have six axes or degrees of freedom of motion allowing the arm to access virtually every point in a three-dimensional spatial area within the reach of the arm.

In one aspect, an oral care implement fabrication system includes: a cluster of process stations arranged around a central area therebetween; a robot having an articulated robotic arm located in the central area between the process stations, the robotic arm being segmented and having a plurality of rotational joints, the robotic arm being operable to access each of the process stations; a grasping tool disposed on a distal end of the robotic arm, the tool configured to releasably engage and transport a plurality of oral care implement bodies between the process stations; a programmable controller operably coupled to the robot, the controller controlling movement, orientation, and position of the robotic arm; a first one of the process stations being a first injection molding machine operable to form oral care implement skeletons from a first material comprising plastic; a second one of the process stations being a second injection molding machine which overmolds a second material onto the first material to form oral care implement overmolded bodies; and a third one of the process stations being a cooling machine which cools the skeletons from the first injection molding machine prior to overmolding the second material; wherein the robotic arm is operable to transfer skeletons from the first injection molding machine to the cooling machine, retrieve cooled skeletons from the cooling machine, and transfer the cooled skeletons to the second injection molding machine for overmolding.

According to another aspect, a robot for molding oral care implement bodies includes: a support base supported from a support surface; an articulated robotic arm rotatably supported by the base, the robotic arm comprising a plurality of joint housings, rotational joints supported by the joint housings, and segments movably coupled to the rotational joints, the robotic arm having six degrees of freedom of movement; a grasping tool disposed on a distal end of the robotic arm, the tool comprising a clamping device operable to releasably engage a first set of oral care implement bodies.

In another aspect, a method for forming a toothbrush body is provided. The method includes: providing a molding fabrication cell including a cluster of process machines arranged around a central area, an articulated robotic arm rotatably mounted in the central area, and a programmable controller automatically controlling movement and operation of the robotic arm; molding a batch of injection molded toothbrush skeletons in a first injection molding machine from a first material; rotating the robotic arm to the first injection molding machine; the robotic arm transferring the batch of skeletons to a cooling machine; cooling the batch of skeletons; the robotic arm transferring and inserting a first partial-batch of cooled skeletons into a second injection molding machine; overmolding a second material onto the first material of the first partial-batch of cooled skeletons in the second injection molding machine; the robotic arm transferring and inserting a second partial-batch of cooled skeletons into a third injection molding machine; and overmolding the second material onto the first material of the second partial-batch of cooled skeletons in the third injection molding machine.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Figure 1:
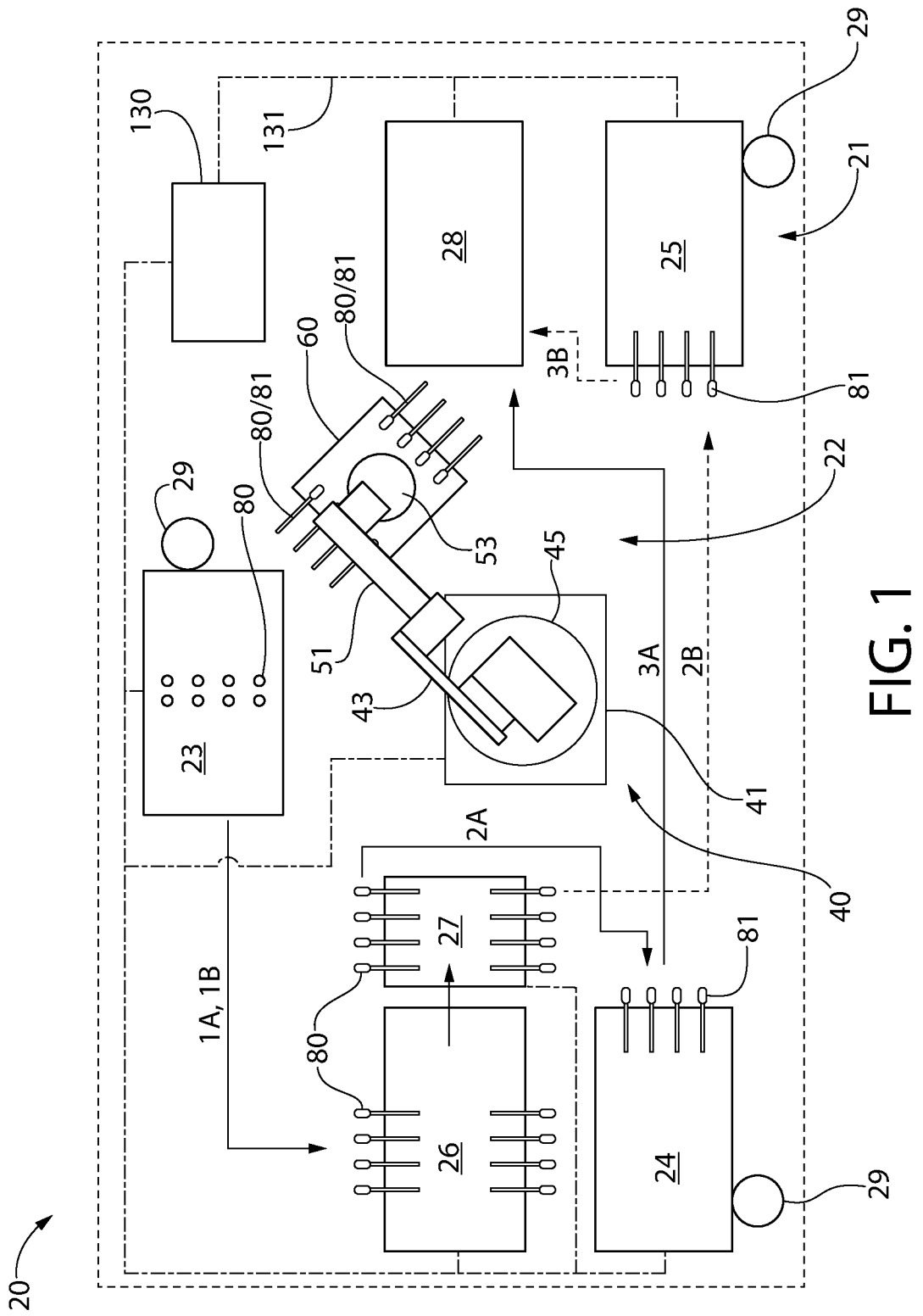
FIG. 1 is a schematic top plan view of a fabrication cell for forming oral care implement bodies according to the present disclosure.

All drawing are schematic and not necessarily to scale.

DETAILED DESCRIPTION

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

FIG. 1 is a top plan view depicting one non-limiting embodiment of an oral care fabrication system configured for injection molding a toothbrush body according to the present disclosure. The system includes a manufacturing or fabrication cell 20 including a cluster of multiple process stations 21 which may be arranged in a generally circular pattern along the perimeter of the cell around a central area 22. In one embodiment, the process stations 21 may include a first injection molding machine 23, a second injection molding machine 24, a third injection molding machine 25, a toothbrush body preform or skeleton cooling machine 26, a cooled perform/skeleton alignment machine 27, and an open top finished product storage container or bin 28.

The first injection molding machine 23 may be a horizontal injection molding machine (HIM) used for initially forming toothbrush body preforms or skeletons from raw base plastic material in granular or pelletized form stored in a material hopper 29 adjacent the HIM. The second and third injection molding machines 24 and 25 may be overmolding vertical injection molding machines (VIMs) for forming an overlay material onto the skeletons. The raw overlay material is stored in a hopper 29 adjacent each VIM. The overlay material may be a flexible elastomeric or rubber material whereas the skeletons may be a more rigid plastic material. Although the third injection molding machine or VIM 25 allows two batches of skeletons to be overmolded simultaneously thereby advantageously reducing downtime and increasing the efficiency and output from the fabrication cell, other embodiments may nonetheless include a single VIM.

Figure 3A:
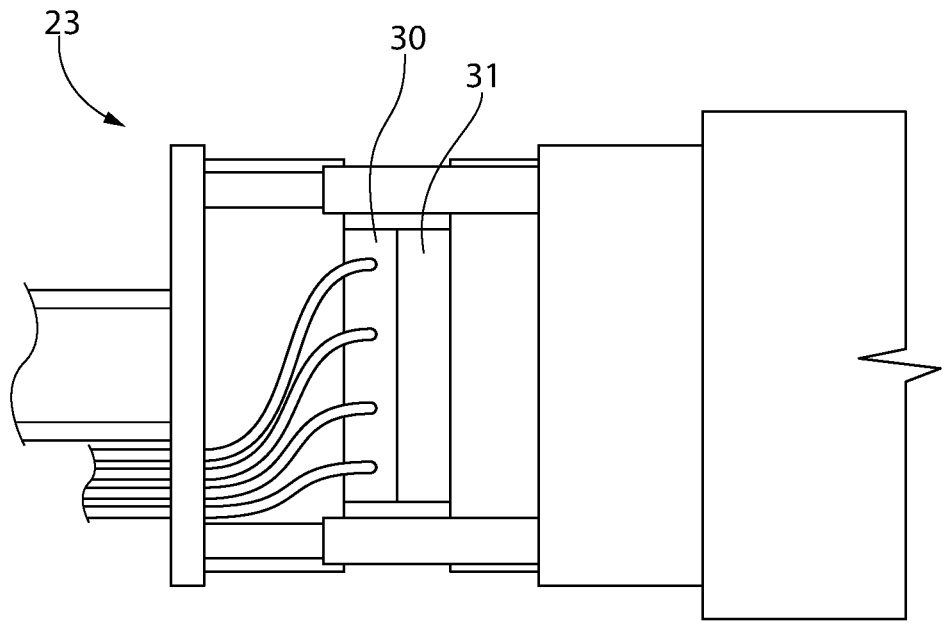
FIGS. 3A and 3B show the preform or skeleton injection molding machine of FIG. 1 in closed and open mold positions respectively.
Figure 3B:
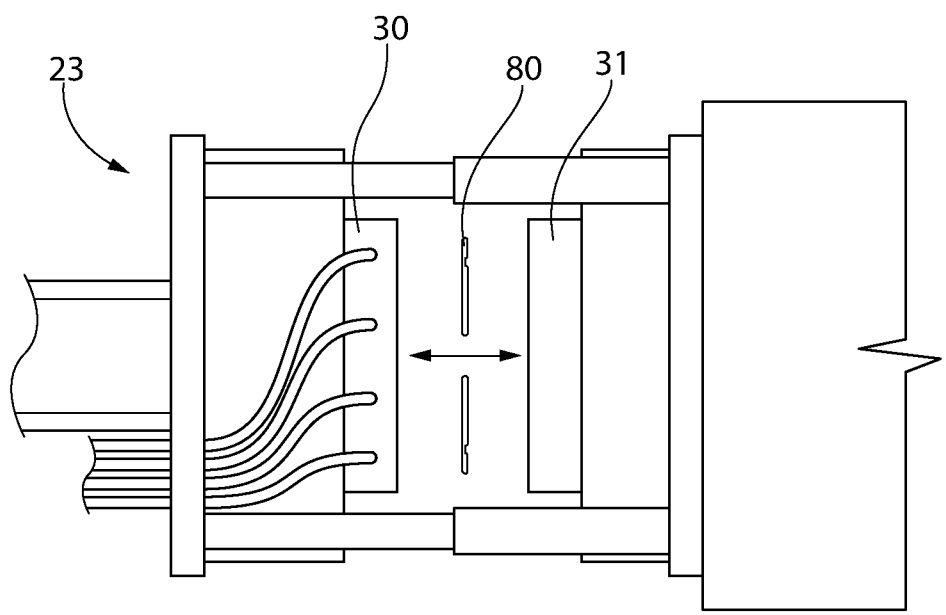
Figure 4A:
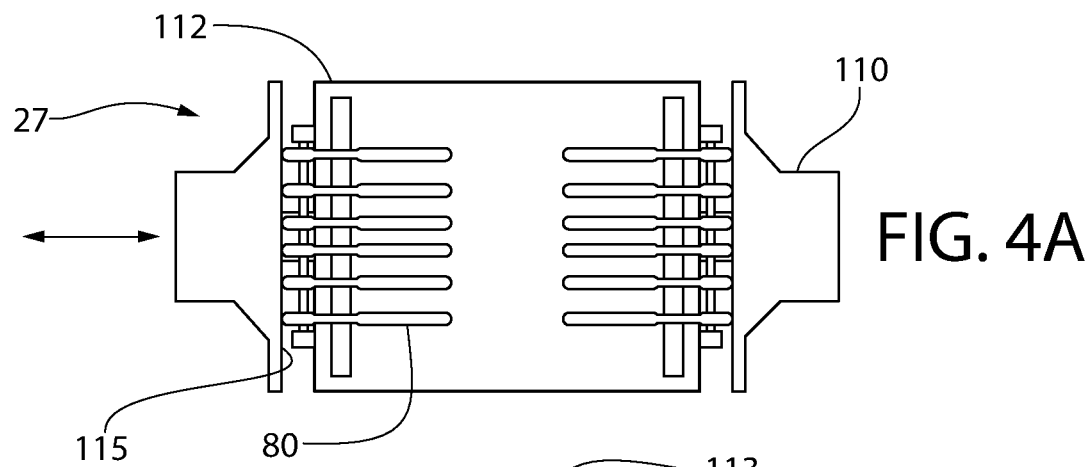
FIG. 4A is a top plan view of the alignment machine of FIG. 1.
Figure 4B:
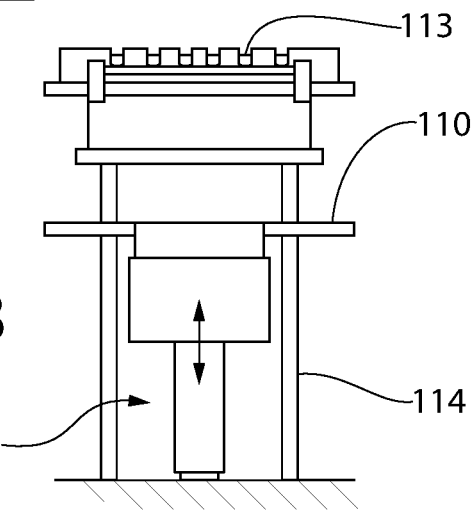
FIG. 4B is a side view thereof.
Figure 4C:
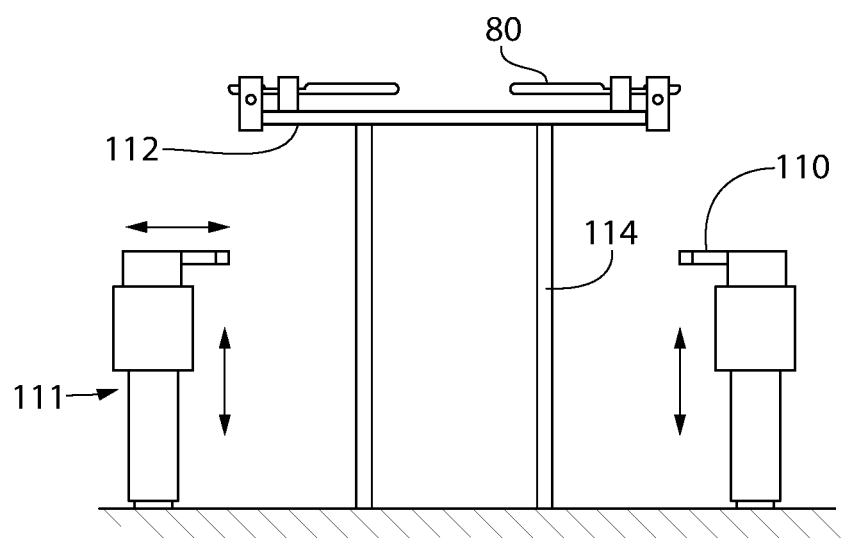
FIG. 4C is a front view thereof.
Figure 5A:
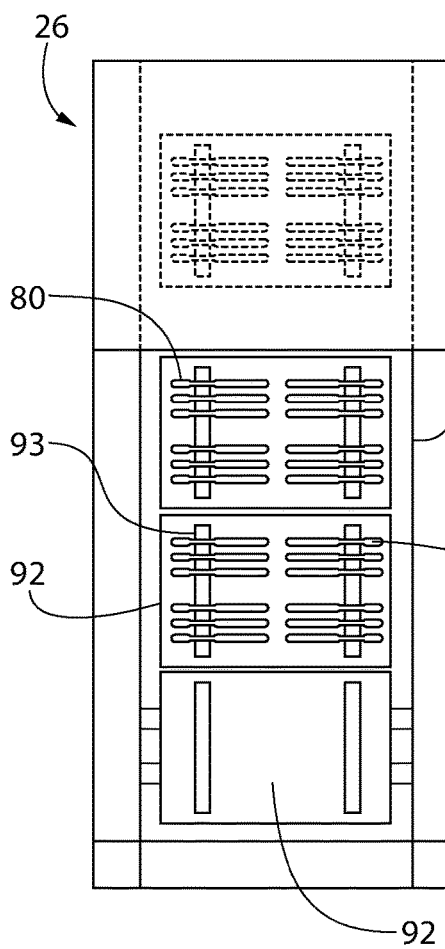
FIG. 5A is a top plan view of the cooling machine of FIG. 1.
Figure 5B:
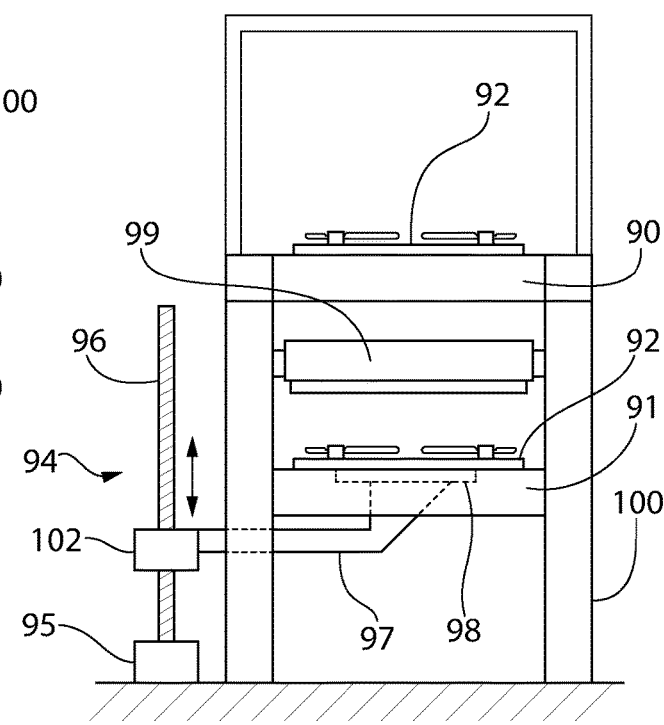
FIG. 5B is a front view thereof.

FIGS. 3A-B show additional details of the horizontal injection molding machine 23. Injection molding machine 23 includes a vertical stationary platen 30 supporting a first half of the skeleton mold and a vertical movable platen 31 supporting a second half of the skeleton mold. The molds each include a plurality of cavities for forming the skeletons. A drive mechanism separates the mold halves allowing the molded skeletons to be removed for further processing in the cell. The injection molding machine 23 is configured to include all usual appurtenances necessary for a fully functioning molding device (e.g. drive mechanisms, electronics, heating elements, raw plastic material feeding devices, injection nozzles, etc.), as is understood by those skilled in the art without further elaboration.

Figure 7A:
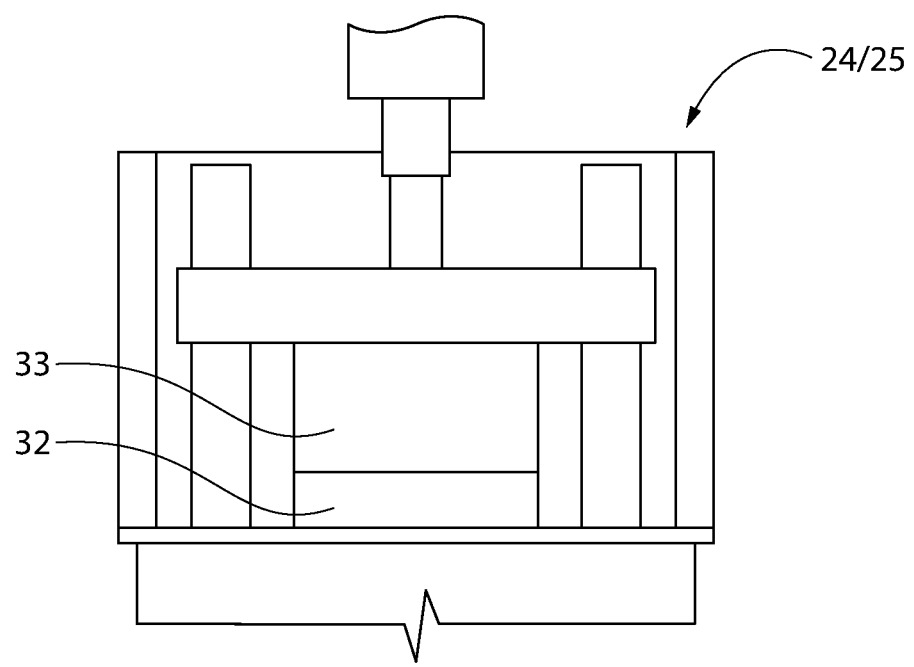
FIGS. 7A and 7B show the overmolding injection molding machines of FIG. 1 in closed and open mold positions respectively.
Figure 7B:
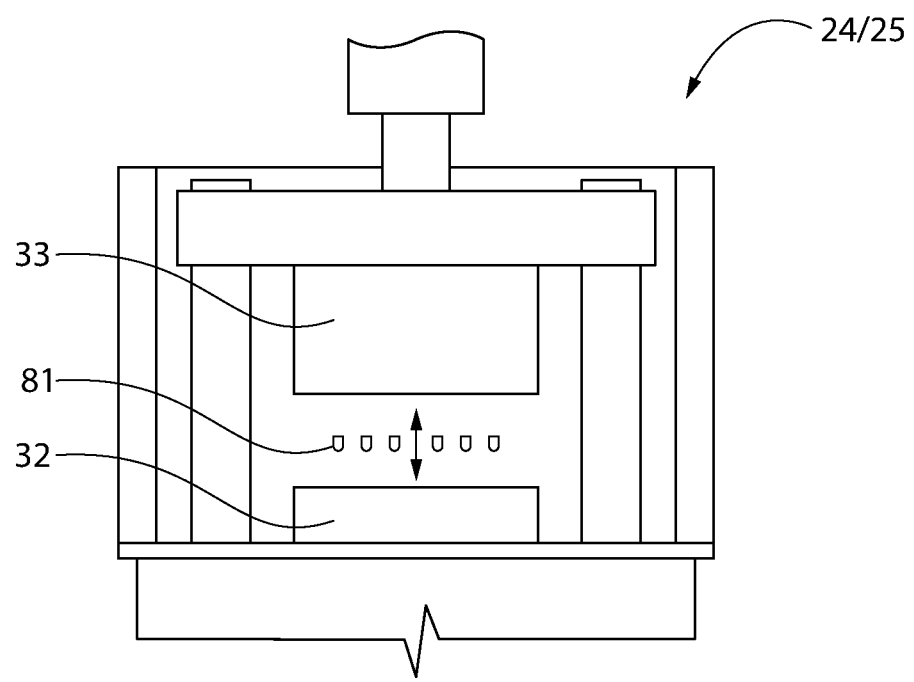
Figure 8A:
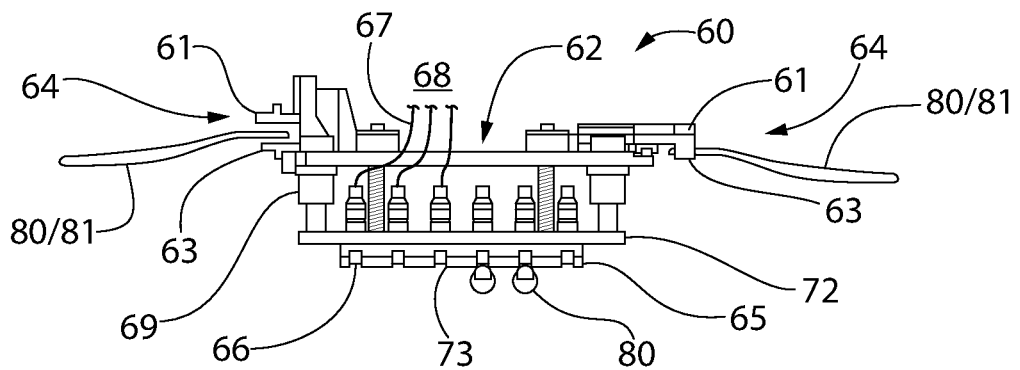
FIG. 8A is a first side view of a grasping tool of the robot of FIG. 1.
Figure 8B:
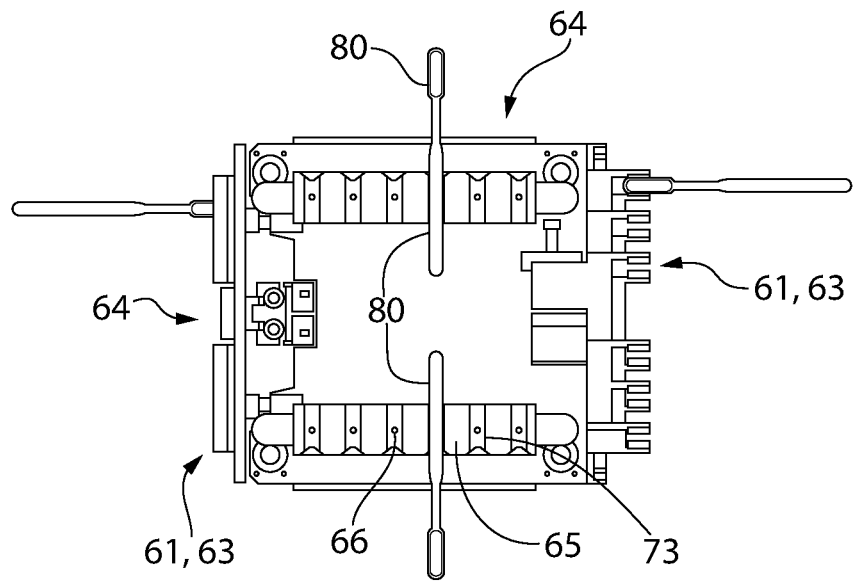
FIG. 8B is a top plan view thereof.
Figure 8C:
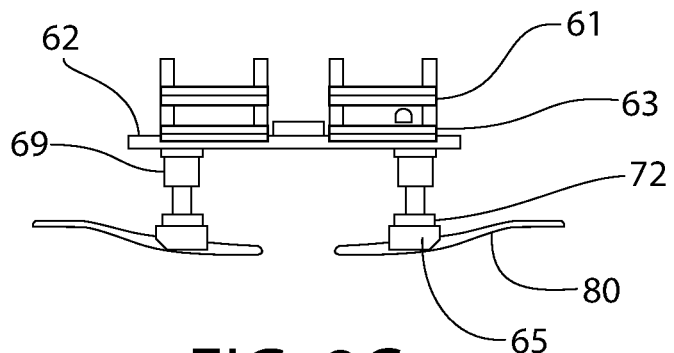
FIG. 8C is a second side view thereof.

FIGS. 7A-B show additional details of the vertical injection molding machines 24 and 25, which in one embodiment may be identical in construction. Injection molding machines 24, 25 includes a horizontal stationary platen 32 supporting a first half of the overlay mold and a horizontal movable platen 33 supporting a second half of the overlay mold. The molds each include a plurality of cavities for holding the skeletons and forming the overlay thereon. A mechanism separates the mold halves allowing the overmolded toothbrush bodies to be removed for further processing in the cell. The injection molding machines 24, 25 are configured to include all usual appurtenances necessary (e.g. drive mechanisms, electronics, heating elements, overlay material feeding devices, injection nozzles, etc.) for a fully functioning molding device, as is understood by those skilled in the art without further elaboration.

Figure 2:
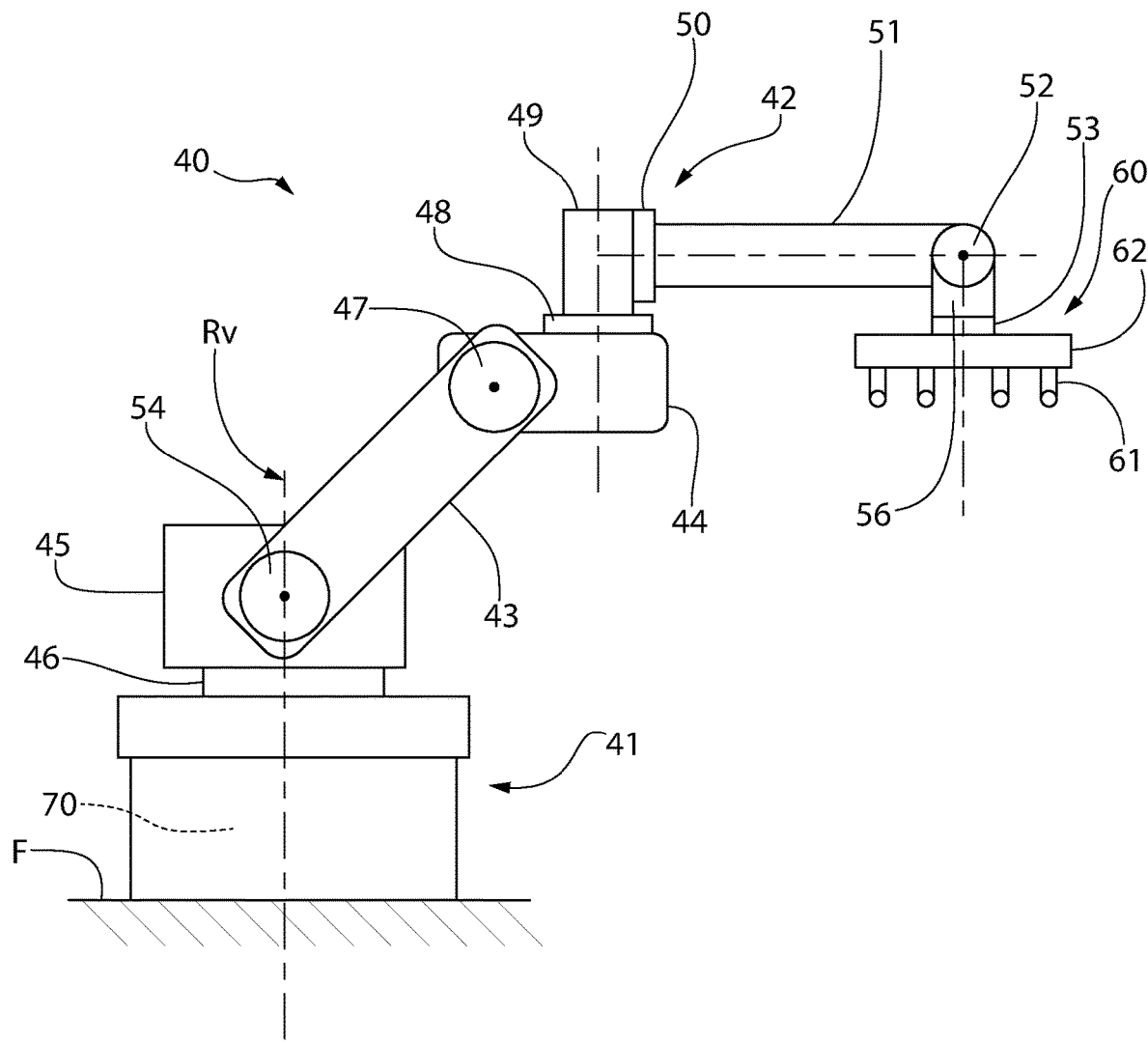
FIG. 2 is a schematic side view of the robot with robotic arm of FIG. 1.

Referring to FIGS. 1 and 2, a rotatable and articulating robot 40 is disposed in the central area 22 of the fabrication cell 20 between the process stations 21. The centrally-located robot 40 includes a support base 41 mounted on a generally horizontal surface such as a floor F or other support surface, a movable main housing 45 rotatably coupled to the base by horizontal rotational joint 46, and a jointed articulating robotic arm 42 rotationally coupled to the housing. A main motor 70 in the base 41 rotates the housing 45 and robotic arm 42 in a horizontal plane up to 360 degrees around a central vertical rotational axis Rv defined by the vertical centerline of the base.

Main housing 45 movably supports the entire weight of robotic arm 42. The robotic arm includes a plurality of movable jointed housings and arm segment rotatable coupled together to create six degrees of freedom of movement of the arm in a three dimensional space, such as forward/back, up/down, left/right, pitch, yaw, roll. The arm 42 generally includes a proximal segment 43 closest to the base 41 and a distal segment 51 farthest from the base (when arm 42 is fully extended horizontally). The terms proximate/proximal and distal and variants thereof refer to relationships with respect to the base 41 for convenience of reference. The proximate end of proximal segment 43 is rotatably coupled to a lateral side of the main housing 45 by a vertical rotational joint 54. Segment 43 is vertically rotatable in a vertical plane with respect to housing 45. The distal end of segment 43 is rotatably coupled in turn to a lateral side of a secondary joint housing 44 by a vertical rotational joint 47. Housing 44 is vertically rotatable in a vertical plane with respect to segment 43. Joint housing 44 is rotatably coupled in turn to a bottom of another secondary joint housing 49 by a horizontal rotational joint 48. Housing 49 is rotatable with respect to housing 44 about rotational axis R1. The plane in which housing 49 may be rotated depends on the rotational position and orientation of housing 44 with respect to proximal segment 43 and base 41 at the time.

Distal segment 51 of robotic arm 42 is rotatably coupled to a front side of housing 49 by a rotational joint 50. Distal segment 51 is rotatable around a rotational axis R2 defined by the axial centerline of segment 51 with respect to housing 49. A terminal joint housing 56 is rotatably coupled to a distal end of distal segment 51 by a rotational joint 52. Housing 56 is rotatable with respect to distal end segment about rotational axis R3.

Robotic arm 42 further includes a grasping tool 60 attached to a distal end of the arm. Tool 60 is rotatably coupled to terminal housing 56 by a rotational joint 53. Tool 60 is rotatable with respect to distal terminal housing 56 on the end of arm 42 around rotational axis R4 by a full 360 degrees of motion.

A plurality of motors may be incorporated into robotic arm 42 as needed at appropriate locations to produce the rotational movements described above and linear movements created by a combination of moving various arm segments and housings in unison or separately in various directions. These motors may be mounted in various components of the robotic arm 42 as in the segments 43, 51 and joint housings 44, 49, and 56, and tool 60 as some non-limiting locations.

Referring to FIGS. 1, 2, and 8A-C, grasping tool 60 in one embodiment may include a substantially flat or planar plate-like platform 62. The term "substantially" connotes that there may some slight variations in structure of platform 62 to account for or to accommodate various appurtenances thereon. Platform 62 is laterally enlarged in two or more directions with respect to distal end of robotic arm distal segment 51 thereby having a length and/or width in all lateral directions which is larger than the width of secondary housing 56 to which the platform is rotatably coupled by rotational joint 53. In one embodiment, platform 62 may have a rectilinear shape such as square (equal sides) or rectangular (unequal sides) in top plan view (see, e.g. FIG. 1). Other shapes may be used including without limitation non-rectilinear polygonal and non-polygonal shapes, and combinations thereof. Platform 62 forms a base for supporting various appurtenances and devices for grasping the toothbrush bodies (e.g. skeletons and overmolded bodies).

Platform 62 includes a clamping device comprising a jaw assembly including a movable upper jaw 61 and lower jaw 63. The jaws 61 and 63 are movable together to a closed position to clampingly engage a plurality of toothbrush skeletons or bodies, and apart to an open position to release the skeletons or bodies. In one embodiment, first and second jaw assemblies each comprising movable upper and lower jaws 61, 63 may be disposed on opposing lateral sides 64 of the grasping tool. One or more servo motors may be disposed on grasping tool 60 which are operable to open and close the jaws. In one non-limiting embodiment, the jaws 61, 63 are configured to grasp the enlarged generally flat untufted heads of the skeletons/bodies of the toothbrushes. The toothbrushes may be oriented so that their handle portions extend laterally outwards from between the jaws when engaged. However, in other embodiments the jaws may be configured to engage the handle portion or other portions of the toothbrush skeletons or bodies instead. The jaws 61, 63 are configured and arranged to hold the plurality of toothbrush skeletons/bodies in laterally spaced apart relationship.

Grasping tool 60 is configured and operable to grasp and carry a plurality of toothbrush skeletons or finished bodies on each lateral side 64 simultaneously. This allows the robot 40 to transfer opposing sets of skeletons and/or bodies between the various process stations 21. By virtue of the articulating arm segments, housings, and rotational joints described above, the robot 40 is operable to change orientation and inclination of the skeletons and bodies to the positions required for insertion/removal of these products into/from the various components of the fabrication cell 20. For example, the horizontal injection molding machine 23 presents the molded skeletons in a vertical orientation. By contrast, the vertical injection molding machines 24, 25 require insertion and removal of the overmolded toothbrush bodies in a substantially horizontal position. The angular orientation of the grasping tool 60 may therefore be changed as required to deliver or remove the skeletons/bodies from each process station in the correct position required for each process station.

In addition to the clamping jaws noted above, the grasping tool 60 may include another mechanism for grasping and holding the toothbrush skeletons or bodies other than by mechanism means. In one embodiment, the tool 60 includes a vacuum device comprising a pair of laterally spaced apart elongated vacuum rails 65 disposed on opposing lateral sides 64 of the tool. Rails 65 may protrude laterally downwards from platform 62 and may be attached to corresponding elongated rail supports 72 which in turn are each supported from beneath platform 62 by one or more columnar support pins 69 of sufficient diameter to preferably rigidly support the rails. The vacuum rails 65 may be disposed adjacent opposing lateral sides 64 near the peripheral edges, which are different than the lateral sides on which the clamping jaws 61, 63 are disposed in the illustrated non-limiting embodiment. Each rail 65 contains a plurality of linearly spaced apart suction ports 66 which are fluidly connected to a vacuum source 68 such as by tubes 67. In one embodiment, each port 66 may be disposed at the bottom of a corresponding slot 73 in the bottom of vacuum rails 65 which is configured and dimensioned to generally complement the dimensions and shape of the portion toothbrush skeletons to be engaged.

Vacuum source 68 may be a hose ultimately connected to a vacuum pump located in base 41 of robot 40, on tool 60, arm 42, or elsewhere in the system. Each port 66 is operable to draw a vacuum and create a suction force to releasably hold/engage a toothbrush skeleton while the vacuum force remains active. When the vacuum source is terminated and negative pressure relieved, the rails release the skeletons. In one embodiment, immediately after processing and forming the skeletons in horizontal injection molding machine 23 while the skeletons are still in a relatively warm/hot and somewhat pliable/deformable condition, the vacuum grasping mechanism ensures that the skeletons are not deformed and distorted until they have had sufficient time to cool in the cooling machine 26. By contrast, the clamping jaws 61, 63 might deform and damage the unhardened skeletons at this stage in the process thereby adversely affecting their appearance, finish, and dimensions.

The cooling machine 26 and alignment machine 27 in the fabrication process sequence fall between injection molding machine 23 and the overmolding injection molding machines 24 and 25. In one non-limiting embodiment, cooling and alignment machines 26, 27 may be physically arranged strategically in the generally circular cluster of process stations 21 between injection molding machines 23 and 24 as seen in FIG. 1. This efficient placement saves process time. Other positioning of these machines, however, may be used.

FIGS. 5A-B and 6A-D show cooling machine 26 in further detail. Cooling machine 26 includes a frame 100 arranged on floor F which supports an elongated upper conveyor 90 and a lower conveyor 91 arranged in vertically stacked and aligned relationship. Conveyors 90, 91 are spaced vertically apart and may be arranged parallel to each other as depicted, or arranged at 90 degrees or another angle to each other in other possible configurations. The conveyors 90, 91 are configured to hold and transport a plurality of trays 92 each having slots 93 configured for holding skeletons. Trays 92 are movable along a length of the upper and lower conveyors such as via motorized tracks, belts, combinations thereof, or other type conveyor mechanisms suitable for the purpose. In one embodiment, trays 92 are movable in a first linear direction on upper conveyor 90 and in a second opposite linear direction on lower conveyor 91.

An elevator 94 is disposed at opposing ends of the upper and lower conveyors 90, 91 which are each operable to engage and transfer the trays 92 between the upper and lower conveyors. Any suitable electric or pneumatic elevator mechanism may be used for this purpose. In one possible non-limiting embodiment, the elevators 94 each generally comprise a drive mechanism 95 operably coupled to a vertical drive shaft 96, a laterally extending arm 97, a vertically movable platform or stage 98 attached to one end of the arm, and a mechanical coupling 102 coupled to the opposite end of the arm and the drive shaft. Drive mechanism 95 may be an electric or pneumatic drive. The drive mechanism operates to raise or lower the stage 98 which engages a tray 92, thereby raising or lower the tray in turn.

The cooling machine 26 operates to cool the still relatively hot or warm and somewhat pliable toothbrush skeletons 80 from the horizontal injection molding machine 23 as noted above. The conveyors 90, 91 have a sufficient length creating a resonance time to allow the skeletons to be adequately cooled and hardened before the overmolding step via ambient air temperature. In some embodiments, in addition to natural cooling at ambient temperatures, the cooling machine may incorporate auxiliary means for more rapidly cooling the skeletons such as fans, a chilled force air system, or other type cooling system as appropriate for the application.

In one embodiment, conveyors 90, 91 may be arranged with their lengths extending in a radial direction outwards from the central area 22 of the cluster of process stations 21 as best shown in FIG. 1. This creates a cooling process movement path in which a tray 92 of relatively warm or hot skeletons first travels from a point proximate to the central area 22, traverses the length of the upper conveyor 90 in a direction away from the central area, is transferred to the lower conveyor 91 at a distal end of the lower conveyor, and returns towards the central area along the lower conveyor. Other arrangements are possible.

After the skeletons 80 have been cooled and hardened in the cooling machine 26, the individual skeletons may require adjustment of their spacing and alignment of their ends to match the cavity configuration of the molds in the overmolding injection molding machines 24, 25 which may be different than injection molding machine 23 and cooling machine 26. To accomplish this, the cooled skeletons are transferred to alignment machine 27 which may be disposed at the head end of the cooling machine 26 in relatively close proximity thereto.

Referring to FIGS. 4A-C and 6A-D, alignment machine 27 in one embodiment includes a vertically elongated frame 114 mounted on floor F. A tray 112 is attached at the upper end of the frame which in one embodiment is preferably positioned close to the same elevation as the lower conveyor 91 of the cooling machine 26. The tray 112 includes a plurality of spaces or slots 113 configured for holding the skeletons. To adjust and align the ends of the skeletons for overmolding, an alignment device includes a floor-mounted electric or pneumatic drive mechanism 111 which operates a vertically and horizontally movable alignment element 110 mounted on top of a drive shaft of the drive. Alignment element 110 has a horizontally broadened body which includes a flat alignment surface 115 facing inwards towards tray 112 for engaging the ends of the skeletons. Element 110 has a sufficient width to simultaneously engage a plurality of skeleton ends for alignment. It will be appreciated that although drive mechanism 111 is shown mounted on the floor for convenience and clarity of illustration, in other embodiments the drive may instead be mounted on and completely supported by the frame 114 instead.

After a batch of cooled toothbrush skeletons 80 are placed on tray 112 of alignment machine 27 from the cooling machine 26, the alignment element 110 moves upward vertically into horizontal alignment with the ends of the toothbrush skeletons. The alignment element then extends horizontally inwards to abuttingly contact and align the ends of the skeletons, pushing the skeletons slightly inward as well during the process. Alignment element 110 then retracts outwards horizontally, and lowers vertically to its starting position.

In one embodiment, an alignment element 110 and corresponding drive mechanism 111 may be provided on opposing sides of the alignment machine 27 as shown to process two sets or batches at the same or a different time. The toothbrush skeletons 80 may be arranged in opposing relationship with either the handle ends or head ends of the skeletons extending inwards towards each other, depending on the positioning required by the vertical injection molding machines 24, 25. This increases the throughput of the alignment machine and minimizes overall molding process cycle time.

To fully automate the process for transferring cooled skeletons 80 from the cooling machine 26 to the tray 112 of the alignment machine 27, an automated linearly movable carriage 99 is provided. Referring to FIGS. 5B and 6A-D, carriage 99 is mounted on frame 100 of cooling machine 26 between the lower conveyor 91 and upper conveyor 90 as shown. The carriage 99 is supported on an overhead track 101 mounted underneath the upper conveyor. The carriage includes a drive mechanism and is movable horizontally along the track 101 between a plurality of retracted positions located between the conveyors to an extended position over the tray 112 of alignment machine 27 (see, e.g. FIG. 6B showing one retracted position in dashed lines and the extended position). The extended position as shown may be beyond the edge of the lower conveyor 91 in which the carriage is in a cantilevered position. Carriage 99 includes a drive shaft 102 coupled to the drive mechanism on the track and a clamping mechanism comprising a clamp support plate 95 to which is mounted a plurality of openable/closeable clamps 92 each operate to releasably engage a skeleton.

In operation, a first batch of cooled skeletons 80 are presented on a tray 92 near the proximate end or edge of the lower conveyor 93 (i.e. end closest to central area 22 of the cell 20). In one embodiment, the batch may include 12 skeletons as a non-limiting example; however, other numbers of skeletons may comprise the batch. The carriage 99 moves horizontally over this tray, the clamp support plate 95 with open clamps 92 lowers vertically to engage the skeletons, and the clamps 92 close (see, e.g. FIG. 6A). The support plate then returns upwards with skeletons attached thereto (see, e.g. FIG. 6B—dashed lines). Next, the carriage continues to move horizontally outwards towards central area 22 from beneath the upper conveyor 90 (see directional arrow) and reaches the extended position over the alignment machine 27 (FIG. 6B—solid lines). The clamp support plate 95 then lowers again to place the skeletons onto the tray 112 of the alignment machine (see directional arrows). The clamps 96 open to release the skeletons, and the now empty support plate rises again. The carriage 99 then returns to one of the plurality of possible retracted positions between the upper and lower conveyors 90, 91 ready for transferring the next batch of skeletons.

It will be appreciated that the slots 93 on the trays 92 in the cooling machine 26 may have a spacing and alignment which complements and matches the required spacing and alignment of mold cavities in the vertical injection molding machines 24 and 25. The skeleton injection molding machine 23 may also have mold cavities and present the molded skeletons to the robot 40 for transfer already in the space and alignment requirements of the vertical injection molding machines as well. Accordingly, in such an embodiment, the alignment machine 27 may instead function as simply a transfer stations for the carriage 99 to transfer cooled skeletons to the tray 112 of the alignment machine from which the robot 40 can retrieve and transfer skeletons to the vertical injection molding machines 24 and 25. The alignment and spacing adjustment features of the alignment machine 27 may therefor be omitted in this case. However, it should be recognized that the alignment and spacing adjustment features may retained even in this case as a precautionary measure to ensure that no shifting in the alignment and spacing of the skeletons has occurred during the carriage transfer to the alignment station.

Operation of the robot 40 and various process stations 21 are controlled by controller 130 shown in FIG. 1. The controller 130 synchronizes and sequences the operation of the robot and process stations to fully automate the molding, cooling, and overmolding processes in a manner which is efficient and expedient. Controller 130 is configured with a programmable processor, memory, data storage, input/output and interface devices, visual displays, communication links, and all other usual appurtenances and components necessary to form a fully programmable and functional computer-based controller as will be appreciated by those skilled in the art without further elaboration. The controller 130 is preprogrammed and configured with program instructions (e.g. control logic/software) which are executed by the processor to control operation of the robot 40 and process stations 21 via suitable wired and/or wireless communication links 131. It is well within the ambit of those skilled in the art to configure the program instructions to direct the robot and process equipment operation in the manner described herein without elaboration.

A method for forming toothbrush bodies via operation of the injection molding system and fabrication cell 20 will now be described. General reference should be made to FIG. 1 throughout the discussion to follow, which is numbered/lettered with process flow arrow Steps 1A-C (solid lines) and 2A-C (dashed lines) to reflect the main processing sequence steps associated with the dual overmolding process that occurs at least partially or fully simultaneously in the cell. This process configuration maximizes product output and minimizes the fabrication cycle time. Advantageously, the cell 20 provides complete molding of the toothbrush bodies from raw granular or pelletized plastic and elastomeric materials to finished fully molded bodies having an overlay material.

To start the molding process, toothbrush preforms or skeletons 80 are first molded from raw plastic material in the skeleton injection molding machine 23. This batch can include any suitable number of skeletons 80. For convenience of description only without limitation, the batch may comprise 8 skeletons as an example recognizing that more or less skeletons may comprise the batch including odd numbers of skeletons. The skeletons 80 may be presented in a vertical upright orientation where the injection molding machine 23 is a horizontal molding machine such as in the present example.

The still relatively warm/hot and slightly pliable skeletons 80 are removed from injection molding machine 23 by robot 40. In one embodiment, the skeletons are extracted by use of suction via the vacuum rails 65 of the robotic arm grasping tool 60 to avoid damaging the pliable skeletons. The vacuum rails 65 may be configured to engage toothbrush bodies including handle and neck portions having various curved and undulating contours (see, e.g. FIG. 8C). The skeletons may be presented in a vertical upright orientation where injection molding machine 23 is a horizontal molding machine. Tool 60 is rotatable into a matching vertical position to engage the skeletons via suction force as already described herein.

The full batch of 8 skeletons is next transferred by robot 40 which rotates counter-clockwise (referring to FIG. 1) to cooling machine 26 (process flow arrow Step 1A, 1B). The cooling machine and alignment machine are disposed between the injection molding machine 23 and injection molding machine 24 in the circular cluster of process stations 21 in fabrication cell 20. The full batch of 8 skeletons 80 is transferred by robot 40 to an empty tray 92 near the proximate end of the upper conveyor 90 of the cooling machine 26 (see, e.g. FIGS. 5A and 6D). The skeletons may be arranged in partial batches, such as without limitation two half-batches of 4 skeletons each in the present non-limiting example; one half-batch on each lateral side of the tray 92 which coincides with the arrangement and spacing presented to robot 40 by the initial injection molding machine 23. In this embodiment, the heads of the skeleton bodies face outwards and the handles face inwards in each half-batch towards each other. The reverse positions however may be used in other embodiments.

It should be noted that the upper and lower conveyors 90, 91 of the cooling machine 26 each hold multiple trays 112 which move sequentially in step fashion through the cooler as shown in the sequential views of FIGS. 6A-D. Each tray may traverse the entire length of conveyors 90, 91 moving along the upper conveyor 90 to its distal end (i.e. farthest from the central area 22 of cell 20), down to the distal end of lower conveyor 91, and back to the proximal end of the lower conveyor where the now fully cooled skeletons are transferred by carriage 99 to the alignment machine 27. The cooling machine 26 therefore has a capacity to hold and process a plurality of skeleton batches at the same time at various stages of being cooled.

Figure 6A:
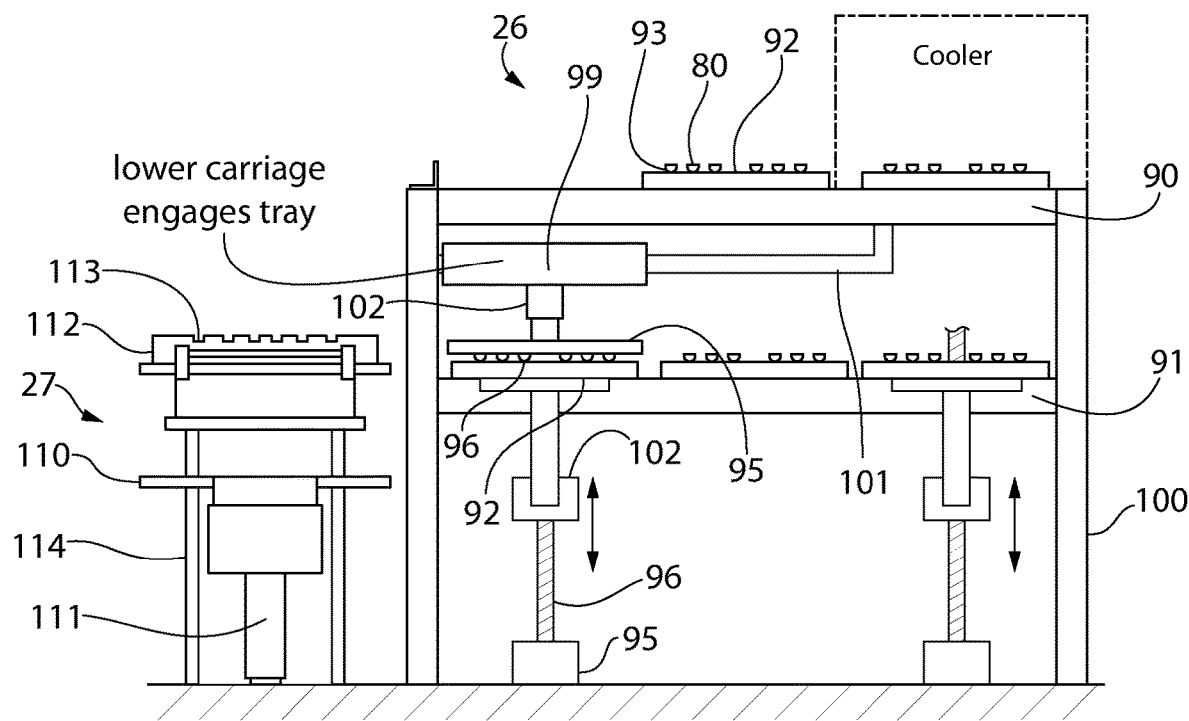
FIG. 6A is a side view of the cooling machine of FIG. 1 showing a first operating position.
Figure 6B:
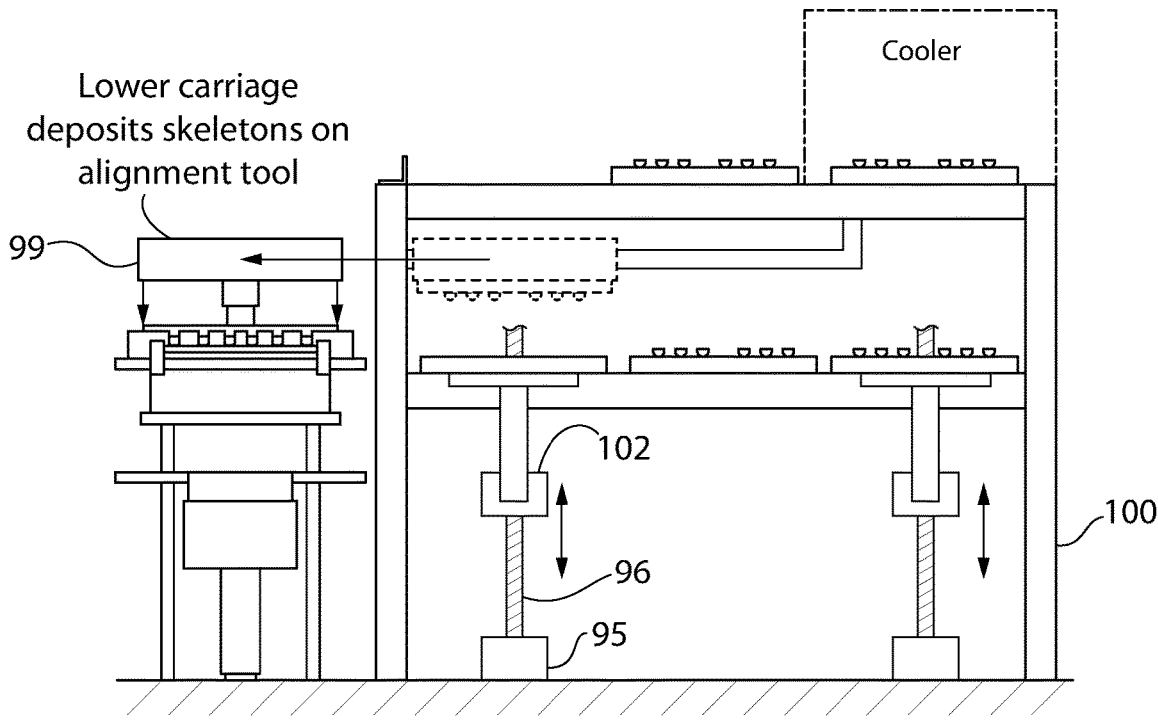
FIG. 6B is a side view thereof showing a second operating position.

Referring now to FIG. 6A, the process continues with the cooling machine carriage 99 retrieving cooled skeletons 80 from the proximate-most tray on the proximal end of lower conveyor 91. As shown in FIG. 6B, the carriage 99 transfers and deposits the full batch of 8 skeletons onto the alignment machine 27 in the manner already described above. The skeletons remain arranged in two partial-batches, such as half-batches of 4 skeletons on each side of the alignment machine with the heads of the skeletons facing outwards as in the cooling machine in this non-limiting example. It bears noting that in other embodiments, partial batches of odd numbers or less than ½ of the total number of skeletons in the batch may be used. The alignment tool 110 of alignment machine 27 next moves vertically upwards and inwards to contact and align the heads of the skeletons (see, e.g. FIG. 6D). The aligned cooled/hardened skeletons are now ready for transfer and overmolding.

The robot 40 removes a first half-batch of skeletons 80 from alignment machine 27 and rotates counter-clockwise to the entrance of the first overmolding injection molding machine 24 (Step 2A). It bears noting from this point forward in the toothbrush formation process, the jaw assemblies of grasping tool 60 comprised of the movable upper and lower jaws 61, 63 are used for transporting the cooled/hardened skeletons and overmolded bodies which are no longer susceptible to deformation. This half-batch is carried on one lateral side of the robot grasping tool 60; the opposing lateral side being empty at this stage in the process. Before inserting the skeletons into injection molding machine 24, a finished half-batch of already overmolded toothbrush bodies 81 previously deposited in injection molding machine 24 is first removed with the robot's grasping tool 60. The tool is then rotated about distal segment 51 of robot 40 and the first half-batch of skeletons already on the tool is then inserted into the injection molding machine 24 for overmolding while the robot moves away to continue the forming process. This creates an empty side of the tool again. The finished overmolded bodies and skeletons may be presented for removal and require insertion respectively in a horizontal orientation where injection molding machines 24, 25 are vertical molders. The grasping tool 60 may be positioned and oriented in a horizontal position, vertical position, or at any angle therebetween to achieve proper orientation of the skeletons and overmolded bodies.

The robot 40 next rotates clockwise and picks up the remaining second half-batch of skeletons from the alignment machine 27 (using the empty side of tool 60). The robot 40 then rotates counter-clockwise carrying the second half-batch of skeletons along with the finished half-batch of overmolded toothbrush bodies 81 previously retrieved from injection molding machine 24 towards the second overmolding injection molding machine 25 on the opposite side of the fabrication cell 20 (Step 2B). On the way to machine 25, the robot first drops the half-batch of overmolded bodies into a finished product bin 28 located adjacent to molding machine 25 to await bristle tufting of the heads (Step 3A). This again frees up one side and its jaw assembly of the grasping tool 60; the other side still being occupied by the second half-batch of skeletons yet to be overmolded.

Next, the robot rotates clockwise from the bin 28 to the second injection molding machine 25. Before inserting the second half-batch of skeletons, another finished half-batch of already overmolded toothbrush bodies 81 previously deposited in injection molding machine 25 is first removed by the robot grasping tool 60. The tool is then rotated and the second half-batch of skeletons already on the tool is then inserted into the injection molding machine 24 for overmolding while the robot moves away to continue the process. This creates one empty side and jaw assembly of the tool again.

The robot rotates counter-clockwise again towards the initial skeleton injection molding machine 23. On the way to machine 23, the robot 40 first drops the finished half-batch of overmolded bodies onboard tool 60 into the finished body bin 28 positioned between molding machines 25 and 23 (Step 3B). This now frees up both lateral sides and jaw assemblies of the grasping tool 60. The robot 40 now continues to rotate counter-clockwise back to the fabrication cycle starting position at the skeleton injection molding machine 23. Robot 40 is now ready to remove a new batch of molded skeletons waiting to be processed in the manner described above.

Although the main process flow is described herein as primarily occurring in a counter-clockwise direction to complete processing through the fabrication cell 20 (referring to the top plan view of FIG. 1), it will be appreciated that the cycle process flow may instead be primarily in a clockwise direction in other embodiments. The invention is not limited by the process flow direction.

The operation of the cooling machine 26 used in the foregoing process and the elevators 94 at the ends of the machine bear further brief comment. It should be noted that the upper and lower conveyors 90, 91 of the cooling machine 26 each hold multiple trays 92 which move sequentially in step fashion through the cooler as shown in the sequential views of FIGS. 6A-D. Each tray may traverse the entire length of conveyors 90, 91 moving along the upper conveyor 90 from its proximal end to its distal end (i.e. farthest from the central area 22 of cell 20), down to the distal end of lower conveyor 91, and back to the proximal end of the lower conveyor where now fully cooled skeletons are readied for transfer by carriage 99 to the alignment machine 27. The cooling machine 26 therefore has a capacity to hold and process a plurality of skeleton batches at the same time at various stages of being cooled and uses elevators 94 to shuffle trays 92 between the upper and lower conveyors as follows.

Figure 6C:
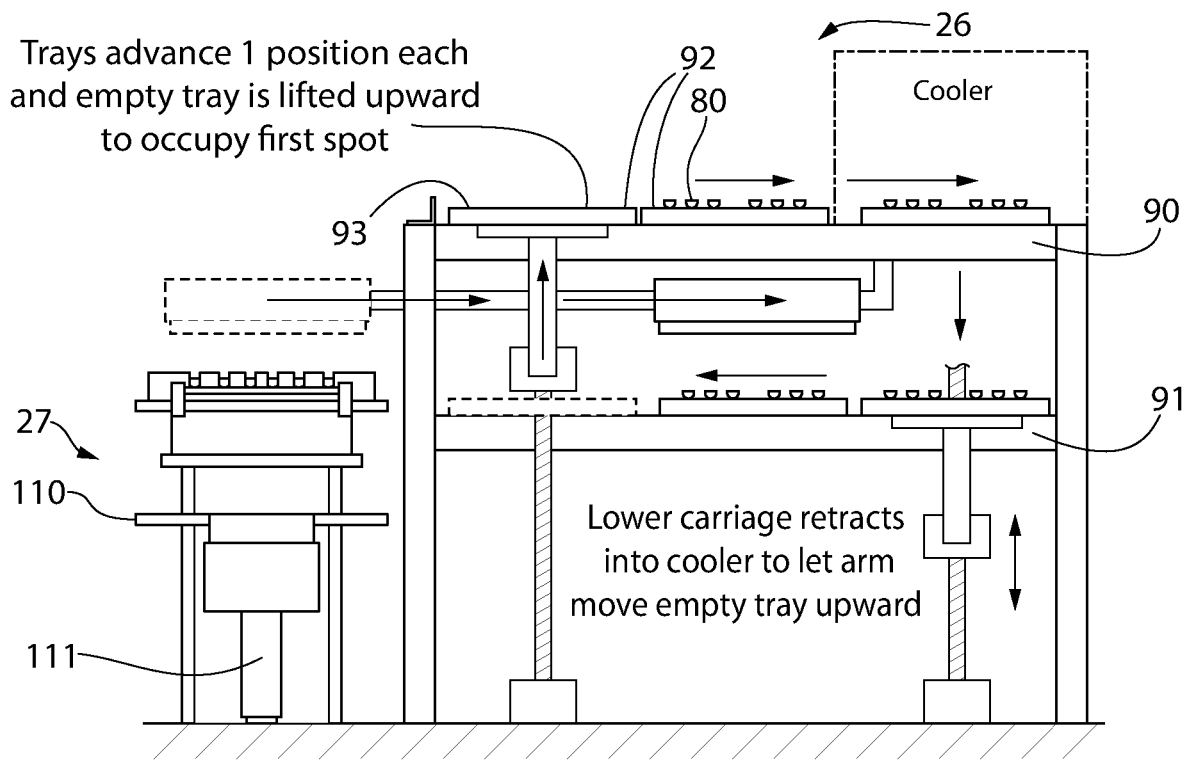
FIG. 6C is a side view thereof showing a third operating position.
Figure 6D:
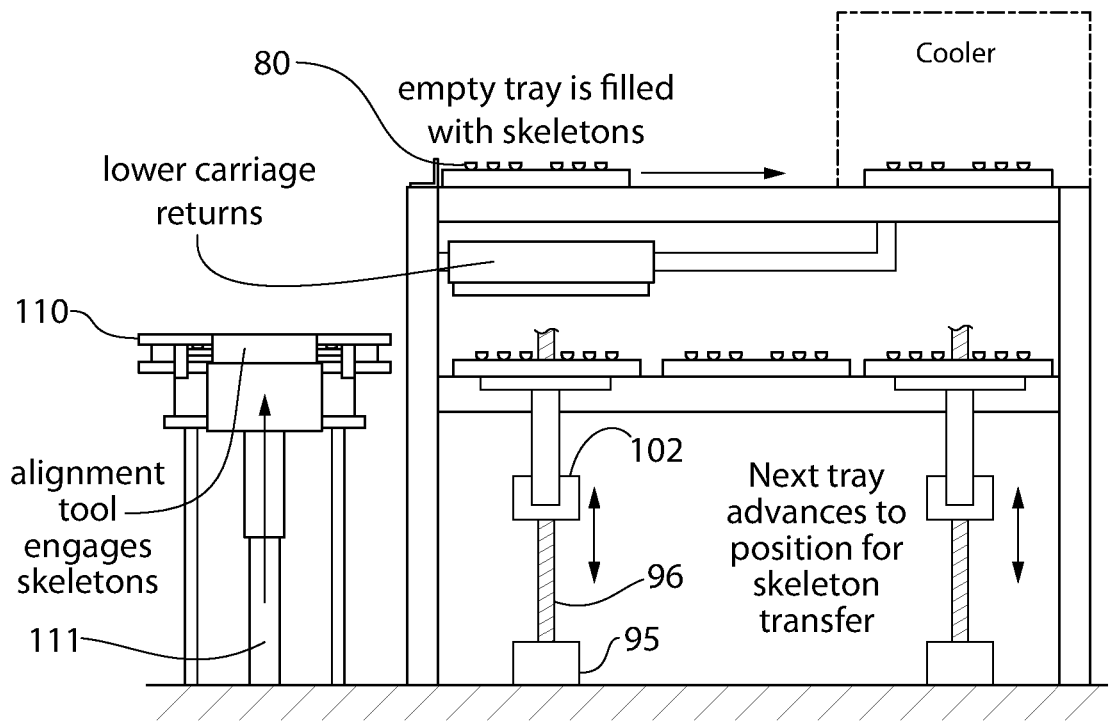
FIG. 6D is a side view thereof showing a fourth operating position.

FIG. 6A shows the cooling machine flow process starting with a cooled batch of skeletons awaiting transfer to an empty alignment machine 27. Carriage 96 first removes the batch from the proximal most tray 92 on lower conveyor 91 and deposits the skeletons onto tray 112 of the alignment machine 27 as shown in FIG. 6B. The carriage 96 moves distally from its extended position over alignment machine 27 back to a retracted position beyond the tray 92 which has been emptied by the carriage on the lower conveyor 91. As shown in FIG. 6C, the elevator 94 lifts the empty tray 92 upwards onto upper conveyor 90. Tray 92 is filled with a new batch of warm/hot skeletons 80 as described above (FIG. 6D). The tray then gradually progresses and moves distally along the upper conveyor to the its distal end. The second elevator 94 lowers the tray 92 down to the distal end of lower conveyor 91 (FIG. 6C). From here, the tray gradually progresses and moves proximally back along the lower conveyor to the starting position shown in FIG. 6A with the batch of now cooled skeletons ready for transfer to the alignment machine 27 again.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care implement fabrication system comprising: a duster of process stations arranged around a central area therebetween; a robot having an articulated robotic arm located in the central area between the process stations, the robotic arm being segmented and having a plurality of rotational joints, the robotic arm being operable to access each of the process stations; a grasping tool disposed on a distal end of the robotic arm, the grasping tool configured to releasably engage and transport a plurality of oral care implement bodies between the process stations; a programmable controller operably coupled to the robot, the controller controlling movement, orientation, and position of the robotic arm; a first one of the process stations being a first injection molding machine operable to form oral care implement skeletons from a first material comprising plastic; a second one of the process stations being a second injection molding machine which overmolds a second material onto the first material to form oral care implement overmolded bodies; and a third one of the process stations being a cooling machine which cools the skeletons from the first injection molding machine prior to overmolding the second material; wherein the robotic arm is operable to transfer skeletons from the first injection molding machine to the cooling machine, retrieve cooled skeletons from the cooling machine, and transfer the cooled skeletons to the second injection molding machine for overmolding; wherein a fourth one of the process stations is a third injection molding machine which overmolds the second material onto the first material to form an oral care implement overmolded body, wherein the robotic arm is operable to retrieve cooled skeletons from the cooling machine and transfer the cooled skeletons to the third injection molding machine for overmolding; and wherein the grasping tool and the third injection molding machine are configured to remove overmolded skeletons and transfer cooled skeletons simultaneously.

2. The system according to claim 1, wherein the first injection molding machine is a horizontal injection molding machine and the second injection molding machine is a vertical injection molding machine.

3. The system according to claim 1, wherein the cooling machine further comprises:
an upper conveyor and a lower conveyors arranged in vertically stacked relationship;
an elevator disposed at opposing ends of the upper and lower conveyors; and
a tray movable along a length of the upper and lower conveyors, and including a plurality of slots for holding the skeletons;
wherein the elevators are each operable to engage and transfer the tray between the upper and lower conveyors.

4. The system according to claim 3, further comprising an alignment machine disposed proximately to the lower conveyor, the alignment machine operable to receive a first set of cooled skeletons from the cooling machine, align ends of the skeletons, and adjust spacing between the skeletons to match mold cavity spacing in the second injection molding machine.

5. The system according to claim 4, wherein the alignment machine comprises a plurality of slots configured for holding the skeletons.

6. The system according to claim 4, wherein the cooling machine further comprises an automated carriage positioned over the lower conveyor and linearly movable beyond an edge of the lower conveyor, the carriage including a plurality of vertically movable clamping members operable to retrieve cooled skeletons from the tray on the lower conveyor and deposit the cooled skeletons on the alignment device.

* * * * *